United States Patent [19]

Rütschle et al.

[11] Patent Number: 4,642,875
[45] Date of Patent: Feb. 17, 1987

[54] MACHINE TOOL WITH A HEADSTOCK

[75] Inventors: Eugen Rütschle, Mühlheim; Hans-Henning Winkler, Tuttlingen, both of Fed. Rep. of Germany

[73] Assignee: Chiron-Werke GmbH, Tuttlingen, Fed. Rep. of Germany

[21] Appl. No.: 712,887

[22] Filed: Mar. 18, 1985

[30] Foreign Application Priority Data

Mar. 23, 1984 [DE] Fed. Rep. of Germany ....... 3410656

[51] Int. Cl.⁴ ............................................ B23Q 3/157
[52] U.S. Cl. ...................................................... 29/568
[58] Field of Search .................. 29/568, 26 A; 408/31

[56] References Cited

U.S. PATENT DOCUMENTS

| 3,233,321 | 2/1966 | Anthony | 29/568 |
|---|---|---|---|
| 3,431,635 | 3/1969 | Balding | 29/568 |
| 3,953,918 | 5/1976 | Bone et al. | 29/568 |
| 4,307,506 | 12/1981 | Hamill, III | 29/26 A |
| 4,403,391 | 10/1983 | Peacock | 29/568 |

FOREIGN PATENT DOCUMENTS

| 1235705 | 3/1967 | Fed. Rep. of Germany . | |
| 1752605 | 11/1971 | Fed. Rep. of Germany . | |
| 2239774 | 2/1973 | Fed. Rep. of Germany | 29/568 |
| 3017613 | 11/1981 | Fed. Rep. of Germany . | |
| 3136612 | 3/1983 | Fed. Rep. of Germany | 29/568 |
| 24510 | 2/1968 | Japan | 29/568 |
| 1316051 | 5/1973 | United Kingdom | 29/568 |

Primary Examiner—Gil Weidenfeld
Assistant Examiner—Daniel W. Howell
Attorney, Agent, or Firm—Pretty, Schroeder, Brueggemann & Clark

[57] ABSTRACT

The machine tool exhibits a magazine and a tool changing device with two interconnected swivel-mounted transfer arms for tool changing. The magazine is disposed outside the range of the transfer arms on the side of an upright supporting the headstock, said side facing away from the headstock, whereby a conveying device to convey the tools from the magazine to the gripping elements of the transfer arms and back again is provided on both sides of the headstock.

8 Claims, 6 Drawing Figures

MACHINE TOOL WITH A HEADSTOCK

BACKGROUND OF THE INVENTION

The invention relates to a machine tool with a spindle which is held in a headstock, with a tool magazine for holding a plurality of tools and with a tool changing device which exhibits two interconnected swivel-mounted gripping arms which together form an angle different from 180°, whereby by means of the gripping arms a tool can be brought from a position outside the spindle axis into a position in the spindle axis suitable for insertion into the spindle.

A machine such as this is known from DE-B 1 235 705. In the known machine tool the tool magazine is situated at the side beside the headstock and can be moved together with the latter whereby the space on the machine may be restricted for a workpiece to be machined.

SUMMARY OF THE INVENTION

The object of the invention is to design a machine tool of the kind described above in such a way that the magazine does not restrict the size of the workpiece to be machined and so that rapid tool changing is possible.

The object of the invention is achieved by the following measures: the spindle axis of the gripping arms extends basically radially to the spindle axis; the magazine is disposed outside the range of the gripping arms on the side of an upright supporting the headstock, said side facing away from the headstock; a conveying device for conveying the tools from the magazine to the gripping elements of the gripping arms and back again is provided on both sides of the headstock. Hereinafter, the gripping arms are called transfer arms.

The fact that the magazine is situated on the side of the upright facing away from the headstock means that it does not intrude into the area which can be occupied by a workpiece to be machined.

The conveying devices on both sides of the headstock ensure that the tools can be transferred quickly from the magazine to the spindle and from the spindle back to the magazine. As a conveying device of this kind is provided on both sides of the headstock, said conveying devices each cooperating with one of the gripping elements, immediately after a tool has been loaded by one of the conveying devices, the other conveying device can convey the tool removed from the spindle to the magazine. A fast tool change is thus possible.

In the case of the known machine described at the beginning, a special conveying device is not provided as in this case the gripping element takes the tools directly from the conveyor chain.

A further advantage of the invention is that the magazine takes up only little space at the side of the headstock and that, in addition, the magazine forms a counterbalance to the headstock on the upright so that the technical outlay, in particular with regard to the desired stability of the machine tool, is reduced. The additional conveying devices for the tools allow, within reasonable limits, distances of any length between the magazine and the transfer arm to be covered without it being necessary to make the transfer arm longer than is absolutely necessary to remove the tool from the spindle.

If the machine according to the invention is a vertical machine (spindle center line runs vertically), it may be sufficient in many cases for the tool disposed vertically in the spindle to be disposed horizontally in the actual magazine. It is then sufficient to design the transfer arm in a basically rigid way with the exception of a controllable gripping device of the gripping element. In an embodiment of the invention, however, a parallel guide for the gripping element is provided. The advantage here is that, during the conveying process in the gripping element of the transfer arm, the tool does not change its orientation, for example its vertical position. In the case of a vertical machine, the advantage is that the tool tip always points downwards and thus there is no danger that drilling oil and swarf from the tool itself can reach its chucking fixture, i.e. the machine taper. As already indicated above, this would however also not be possible if the tool is moved from its vertical working position into a horizontal position without the tool tip being raised higher during this procedure than is the case for the horizontal position. The movement of the tool with the tip always pointing downwards in a vertical machine is, however, considered to be particularly advantageous. In the case of a horizontal machine, where the axis of the tool runs horizontally during working, the described embodiment is particularly advantageous. Here too, the axis of the tool always remains horizontal during the movement by means of the gripping element. In the case of such horizontal machines, after being removed from the spindle the tool can frequently not be moved away downwards but it is frequently moved away upwards. In such a case, without a parallel guide the tool tip would point upwards and in this way swarf could reach the machine taper area, as a result of which safe mounting of the tool could be endangered during the next machining operation.

According to one embodiment of the invention, the conveying device may preferably exhibit a displaceably guided additional gripping element. The position of the tool during its conveying by the conveying device is assured by means of the additional gripping element. The reason why this is especially practical is because tools of this kind frequently exhibit a special keyway which ensures that they can only be inserted into the spindle in a defined position.

In one embodiment of the invention, at least in the two end positions of the movement of the additional gripping element the latter is disposed in a predetermined orientation (e.g. perpendicular). The advantage here is that introducing the tool just used into the magazine and removal of the next tool from the magazine presents no difficulties whatsoever because the tool exhibits an exactly defined orientation, for example with perpendicular longitudinal axis.

In one embodiment of the invention, the headstock is displaceably held on the upright whereby the extremity of the conveying device facing the headstock is fastened to the headstock in such a way that it also executes the latter's displacement movement relative to the upright. The advantage here is that the assignment of the spindle-side end of the conveying device to the respective spindle position is possible in a particularly simple manner.

In one embodiment of the invention, a guide piece connected to the additional gripping element is displaceably guided on a guide rail, one extremity of which is swivel-mounted on the upright in the area of the loading and unloading aperture of the magazine, the other end area of said guide rail being swivel-mounted on the headstock, whereby means are provided to compensate for the changing distance between said two swivel mounts during displacement movements of the headstock. This provides a solution which is simple to execute in terms of design for the conveying device. The means to compensate for the aforementioned distance can, for example, be as follows: the guide rail is rigidly swivel-mounted merely at one end, whereas its other end is held in a sliding guide and the sliding guide itself is swivel-mounted.

In one embodiment of the invention, the additional gripping element is fastened to a rod which is displaceably guided on a carriage, whereby the carriage is displaceably guided basically transversely to the lengthwise direction of the rod. This provides a simple possibility for parallel guiding of the tool during the entire conveying by means of the conveying device.

In one embodiment of the invention, when the carriage is situated in its position farthest away from the magazine, the guide piece engaging the guide rail is situated in an extension of the axis of the swivel mounting with which the guide rail is swivel-mounted on the headstock. Advantageously, when in its position closest to the magazine, the guide piece is situated in an extension of the axis of the swivel mounting with which the guide rail is swivel-mounted on the upright. These embodiments ensure that, in that position in which it transfers a tool to the magazine or accepts a tool from the latter or when it accepts a tool from the gripping element of the transfer arm or transfers a tool to the latter, the additional gripping element always occupies an exactly defined height position (for a vertical machine) with respect to the magazine and/or the transfer arm.

In one embodiment of the invention, a projection of the carriage engages a helical guide of a rotatingly driveable roll which is disposed parallel to the displacement movement of the carriage whereby the helix angle of the helical guide is different over the length of the roll. This provides a simple drive device for the carriage, whereby it is advantageous that the carriage is driven at varying velocity while the rotational speed of the roll is constant. It is thus possible at the beginning and end of the carriage movement range to drive the latter relatively slowly and, in contrast, to move more quickly in the middle range, thus minimizing conveying time on the one hand and, on the other hand, avoiding high acceleration of the tool.

Further features and advantages of the invention will become apparent from the following description of a specimen embodiment of the invention with reference to the drawings which show the essential details of the invention, and from the claims. The individual features can be realized individually or in any desired combination in an embodiment of the invention.

DETAILED DESCRIPTION OF THE PREFERRED EMBODIMENT

Figure 1:
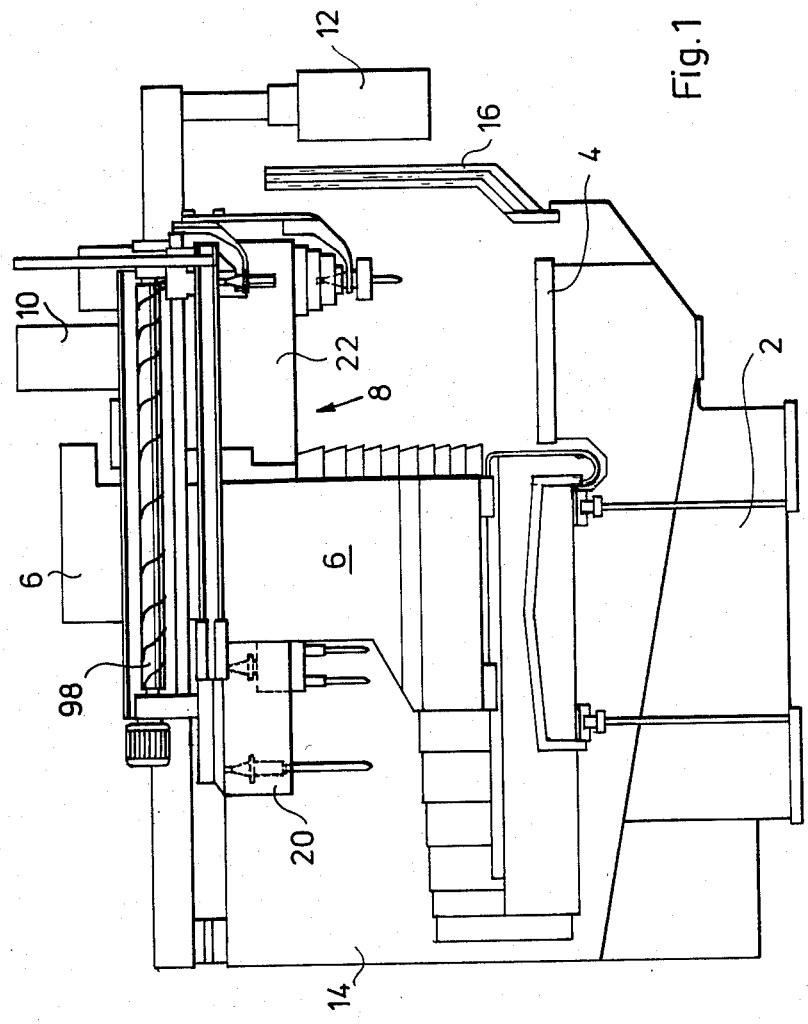
FIG. 1 shows a side view of a vertical machine.

FIG. 1 shows the overall view of a vertical machine tool, namely a numerically controlled machine tool with vertical spindle center line. The rigid work plate 4 for the workpieces is mounted on a machine bed 2. An upright 6 of the machine can be moved in two directions at right angles to each other in a horizontal direction. A headstock 8 on the upright 6 is displaceably guided in a vertical direction and is driven by an electric motor 10. The machine operator stands on the right in FIG. 1 and can operate the machine by means of a control panel 12. On all sides of the machine are sheet metal walls 14 with a transparent pane on the front side to protect against drilling oil or swarf being thrown out. Disposed on the rear of the upright 6, on the left in FIG. 1, is a tool magazine 20 which has capacity for 42 tools in a closed chain provided with gripping elements. When viewing the machine from the front side, i.e. from the right in FIG. 1, the magazine 20 projects to both sides in a horizontal direction above the headstock 8. There the magazine has an aperture in the proximity of both the right and left lateral surfaces 22 of the headstock 8 through which openings the tools can be automatically introduced into the magazine and can be automatically removed from the latter.

Figure 2:
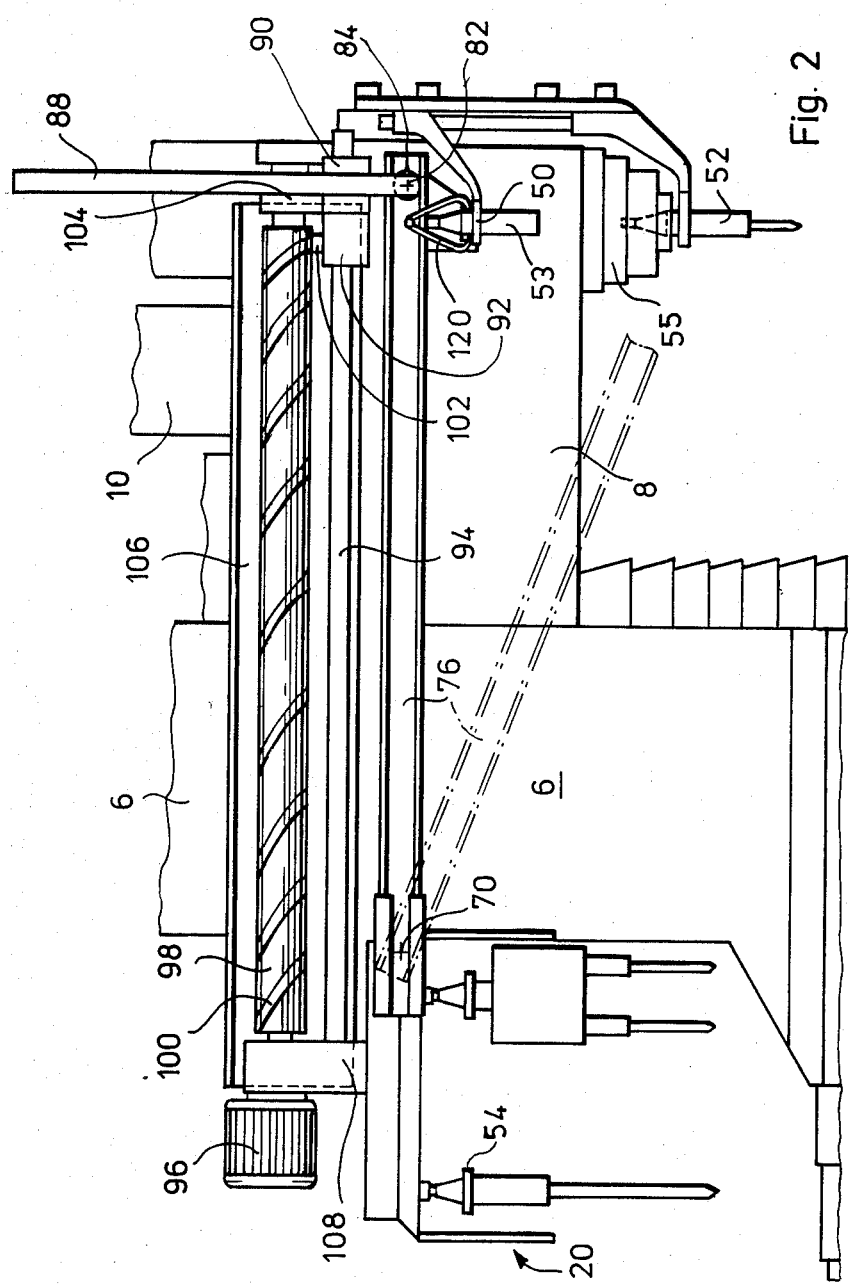
FIG. 2 shows a side view of a detail from FIG. 1.
Figures 3, 4:
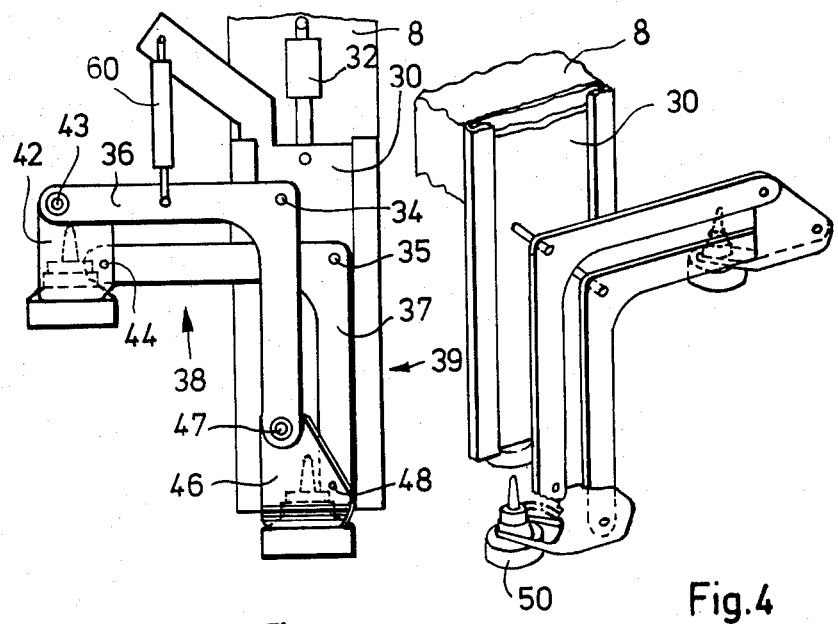
FIG. 3 shows a front view of the transfer arms corresponding to arrow III in FIG. 2.
FIG. 4 shows a representation similar to FIG. 3, but drawn in perspective whereby the transfer arms are situated in their other end positions.
Figures 5, 6:
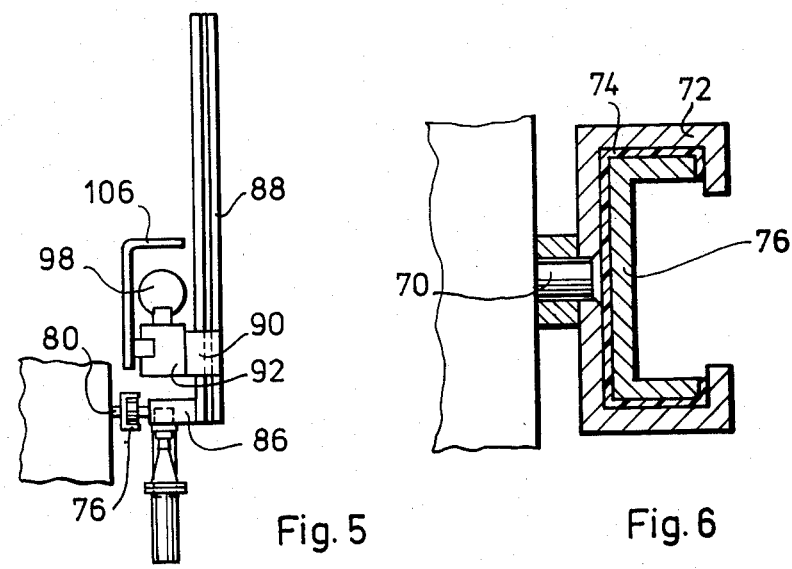
FIG. 5 shows a section on line V—V in FIG. 2.
FIG. 6 shows a section on line VI—VI in FIG. 2, enlarged as compared with FIG. 5.

On the front side of the headstock 8, as is visible in FIG. 3, there is a vertically-displaceable plate 30 which can be driven by means of a hydraulic piston-cylinder unit 32. On the plate 30, two angle pieces 36 and 37 are swivel-mounted about two shaft journals 34 and 35 which are equally spaced both laterally and in height. The two arms of each angle piece together form an angle of 90°. The two horizontally-extending arms of the angle pieces shown in FIG. 3 form a transfer arm 38, the vertical arms forming a transfer arm 39. The arms of the two angle pieces are equally long. A plate 42 is swivel-mounted by means of joints 43 and 44 on the free ends of the two horizontally-extending arms in FIG. 3; a plate 46 is swivel-mounted by means of joints 47 and 48 on the free ends of the vertical arms. The axes of the joints 43, 44 and 47, 48 extend parallel to the axis of the shaft journals 34 and 35, and the connecting plane of the joints 43 and 44 is parallel to the connecting plane of the joint pins 34 and 35 and the joints 47 and 48. Thus a parallel guide is formed for the plates 42 and 46, said parallel guide holding these plates in the shown position independent of the swivel position of the angle pieces 36 and 37. A controllable gripping element 50 is disposed on each of the plates 42 and 46, said gripping element in known manner grasping or gripping a projecting collar 54 of the tool 52 or 53. This collar 54 is detailed in FIG. 2 for one of the tools in the magazine. The device for holding and conveying the tools within the magazine is not represented for reasons of simplifying drawing.

FIGS. 2 and 3 show the position in which the tool 53 held by the vertical arms of the angle pieces 36 and 37 is mounted in the spindle 55 of the machine tool. The gripping element 50 is designed in such a way that it embraces the collar 54 of the tool 53 with some play, thus allowing the tool to rotate freely when the machine tool is operating. The gripping element 50 need not be opened for this. In other embodiments of the invention, it may, in contrast, be necessary for the gripping element 50 to open when the tool is mounted in the spindle. Plate 30 is situated in its upper end position in the position shown. For releasing the tool and for the subsequent tool change, the chucking mechanism of the tool in the spindle 55 is released, then the plate 30 is retracted downward by the piston-cylinder unit 32, until the tool has completely left the spindle, and subsequently by actuation of a piston-cylinder unit 60 which engages the plate 30 on one side and the angle piece 36 on the other, the angle pieces 36 and 37 are swivelled through 90° so that the arms pointing to the left in FIG. 3 now point downwards. The tool originally chucked is now situated in a position raised to the right, as shown in FIG. 4, and the tool held in the support of plate 42 comes under the free tool mounting aperture of the spindle. Subsequently plate 30 is raised again and the tool is clamped.

If one assumes that both tools held by the angle pieces 36 and 37 are of equal weight, a state of equilibrium exists when the tools are at the same height. The positions shown in FIGS. 3 and 4 could be compared with the two possible end positions of a pendulum weight. This offers the advantage that only a relatively small piston-cylinder unit 60 is necessary to swivel the angle pieces 36 and 37 even for relatively large weights of the tools, and, in addition, after the previously mentioned state of equilibrium has been passed through, the movement of the angle pieces 36 and 37 is again decelerated automatically so that there is no danger of hard impacts at the end of the movement. The reason why this pendulum effect occurs is because the swivel axes 34 and 35 run horizontally in the specimen embodiment.

In the viewing direction of FIG. 3, a conveying device is provided on both sides of the headstock 8 and the upright 6, said conveying devices not being shown in FIG. 3, however being clearly evident in the view of FIG. 2. This tool conveying device has the purpose of conveying tools to and fro between the magazine 20 and the gripping elements 50 of the horizontally-disposed arms of the angle pieces 36 and 37.

A guide piece 72 basically formed by a section of a U-profile is swivel-mounted on the upright 6 about an axis 70 indicated in FIG. 2, said guide piece being lined by a plastic layer 74 of friction-reducing plastic, in this case polytetrafluorethylene. A guide rail 76 which is formed by a U-profile is displaceably guided in the guide piece 72 and can also be swivelled by means of the axis 70. The guide piece 72 slightly overlaps the guide rail 76 to secure the latter in its position. The axis 70 is situated directly in front of the left loading and unloading aperture of the magazine 20. The front end of the guide rail 76, on the right in FIG. 2, is swivel-mounted on the headstock 8 by means of a shaft journal 80. The swivel axis of the shaft journal 80 extends horizontally, as does swivel axis 70, and is coaxial with the axis 82 of a wheel 84 which engages the guide rail 76 and is guided by the latter, namely when the wheel 84 is situated in its forward-most position, on the extreme right in FIG. 2.

The wheel 84 is fastened by means of a rigid connecting piece 86 to the lower end of a guide rod 88 which extends perpendicularly and is displaceably guided in guide pieces 90 of a carriage 92. The carriage 92 is displaceably guided on a rod 94 which extends horizontally from front to rear, from left to right in FIG. 2. Parallel to the rod 94 is a roll 98 driven by an electric motor 96. Said roll 98 has a helical guide keyway 100 whose helix angle at both ends of the roll 98 is relatively small, but large in the middle area of the roll 98. A pin 102 mounted on the carriage 92 engages the guide keyway 100. When the roll 98 is rotation-driven, depending on its direction of rotation and by means of the pin 102 engaging the roll, the roll moves the carriage 92 forwards or backwards with the guide rod 88 attached thereto. The wheel 84 rolls between the two sides of the guide rail 76. The front bearing 104 of the roll 98 is fastened to an angle plate 106 whose rear end area is fastened to a bearing block 108 for the rear end of the roll 98 which is rigidly connected to the upright 6. In this way, the roll 98, which projects far to the front above the upright 6, is securely mounted on the upright 6.

FIG. 2 shows the machine in the uppermost position of the spindle 55 in which the guide rail 76 extends horizontally. Dot-dash lines also indicate that position taken by the guide rail 76 which the latter takes when the spindle 55 is situated in its lowest possible position. In this case, the rear end of the guide rail 76 in the guide piece 72 is displaced somewhat to the front. In addition, what is not shown in the drawing, the guide rod 88 is then situated in a downwards-displaced position in which it is forcibly moved because the wheel 84 connected to it engages the guide rail 76. As a result the guide rod 88 also executes all vertical movements of the spindle or of the headstock 8 holding the spindle in such a way as to permit rotation. Irrespective of the height position of the guide rod 88, however, the carriage 92 remains in its height position as shown in FIG. 2 and the pin 102 still engages the guide keyway 100.

If the carriage 92 is situated in its position farthest displaced to the rear, to the left in FIG. 2, then the rotation axis 82 of the wheel 84 is situated exactly in the axis 70 of the swivel mounting of the guide piece 72. As a result, the height position of the guide rod 88 does not change in this position, even if the headstock 8 executes vertical movements.

An additional gripping element 120 is disposed on the connecting piece 86 on the lower end of the guide rod 88, said gripping element being designed in such a way that it can grip the tool held by the gripping element 50 which is fastened to the plate 42. For this purpose the gripping element 50 is also correspondingly designed: it provides space in its longitudinal centre plane for the engagement of the additional gripping element.

It is assumed that the horizontal arms of the angle pieces 36 and 37 shown in FIG. 3 have just moved into this horizontal position and that the tool held by the gripping element 50 of the plate 42 is to be removed from the gripping element 50 so that it can be replaced by another tool from the magazine 20. The gripping element 120 is in a position in which it can be brought to engage the tool as the carriage 92 is in its forward-most position. As soon as the gripping element 120, which is actuated pneumatically in a manner not shown, has gripped the tool 53, the previously-closed gripping element 50 opens. The roll 98 is now driven in such a way by the motor 96 that it moves the carriage 92 to the rear until the latter has reached its rear-most end position. The gripping element 120 is now in a position in which the tool held by the gripping element is introduced into an empty holding device in the magazine 20. This holding device now grips the tool, the gripping element 120 opens and thus releases the tool. The opened gripping element permits the tools held by the chain in the magazine to be conveyed through the opened gripping element. The conveying device of the magazine 20 begins to move and brings into its range the next tool to be gripped by the gripping element 120. The gripping element 120 grips this tool, is then moved forward again to the gripping element 50 by the roll 98 and transfers the tool to the gripping element 50. When the machine has completed all the work to be executed with the tool 52, the tool 52 is removed from the spindle, the angle pieces 36 and 37 ar swivelled and the new tool just conveyed in the described way to the gripping element 50 is clamped in the spindle.

Disposed on the side of the machine facing away from the drawing plane of FIG. 2, is a completely identical tool conveying device (of mirror-image construction, of course) which feeds the tools to that gripping element which is disposed on plate 48 and removes them again from this gripping element.

Even when the headstock 8 is in a lowered position during the tool changing process, as is nearly always the case, whereby the guide rail 76 assumes an inclined position, the transfer of the tool between the gripping element 50 and additional gripping element 120 can be carried out in exactly the same way as just described because the gripping element 120 is always situated at the same height in relation to the headstock 8, when the carriage 92 is at its forward-most position. In the same way, the additional gripping element 120 is always situated at the same height in relation to the magazine 20, regardless of the height position of the headstock 8, when the carriage 92 has moved into its rear-most position. As a result, even when the headstock 8 is lowered, the transfer of the tool from the gripping element 50 to the additional gripping element 120, the subsequent conveying to the rear, whereby the wheel 84 rolls upwards in the guide rail 76 and thereby simultaneously raising the guide rod 88 and thus the gripping element 120, as well as transfer to the magazine can take place in exactly the same way as described above. The guide rod 88 remains perpendicular in each position of the headstock 8 and of the carriage 92 and thus forms a parallel guide for the additional gripping element 102 so that the latter can safely grip and transfer the tools.

The guide pieces 90 which guide the guide rod 88 contain ball circulating guide ways which guide extremely precisely and only cause low friction. Thus the guide rod 88 cannot jam in its sliding guide.

The data shown in parentheses in the claims do not represent a limitation but they are intended to facilitate comprehension.

What is claimed is:

1. A machine tool, comprising:
    a headstock arranged displaceably along one axis with respect to a base of said machine tool;
    a work plate arranged on a frontside of said headstock for mounting workpieces;
    a magazine for storing tools, said magazine being arranged on a backside of said headstock;
    a conveying device arranged on a lateral side of said headstock for transporting said tools between said magazine and a spindle in said headstock, said conveying device comprising a guide rail, one end of which is connected to said magazine and the other end of which is connected to said headstock;
    a gripping element on said guide rail for conveying said tools along said guide rail between a first position at said magazine and a second position at said headstock;
    a gripping arm rotatably mounted on said headstock for transfering said tools between said second position at said headstock and a third position within said spindle;
    a guide rod connected to said gripping element, said guide rod being axially displaceable in a carriage in a first direction parallel to said one axis; and
    means for displacing said carriage between said headstock and said magazine in a second direction perpendicular to said first direction.

2. A machine tool according to claim 1, wherein said means for displacing said carriage comprises a projection on said carriage for engaging a helical guide on a rotatingly driveable roll which is disposed parallel to said second direction.

3. A machine tool according to claim 2, wherein said helical guide is provided with a helix angle that is variable over the length of said roll.

4. A machine tool according to claim 1, wherein said guide rail is swivel-mounted to said headstock by a first swivel-mounting and said gripping element is guided in said guide rail by means of a guide piece, said guide piece being aligned with the axis of said first swivel-mounting when said carriage is in a position farthest away from said magazine.

5. A machine tool according to claim 1, wherein said guide rail is swivel-mounted to said base by a second swivel-mounting and said gripping element is guided in said guide rail by means of a guide piece, said guide piece being aligned with the axis of said second swivel-mounting when said carriage is in a position closest to said magazine.

6. A machine tool according to claim 1, wherein one conveying device each is arranged on both lateral sides of said headstock.

7. A machine tool according to claim 6, wherein said gripping arm comprises two transfer arms, each of said transfer arms having a vertical arm and a horizontal arm forming a ninety degree angle with respect to each other, the free ends of said gripping arm each being provided with further gripping elements.

8. A machine tool according to claims 6 or 7, wherein said gripping arm is swivel-mounted to said headstock such that in two end positions of a swivel-motion of said gripping arm, said further gripping elements hold one of said tools in a first position coaxial to said one axis, and another of said tools in said second position parallel to but spaced from said one axis, said gripping arm being further mounted on a plate, said plate being displaceable on said headstock in a direction parallel to said one axis.

* * * * *